United States Patent
Shambaugh et al.

(10) Patent No.: US 7,085,719 B1
(45) Date of Patent: Aug. 1, 2006

(54) VOICE FILTER FOR NORMALIZING AN AGENTS RESPONSE BY ALTERING EMOTIONAL AND WORD CONTENT

(75) Inventors: Craig R. Shambaugh, Wheaton, IL (US); Anthony Dezonno, Bloomingdale, IL (US); Mark J. Power, Carol Stream, IL (US); Kenneth Venner, Winfield, IL (US); James Martin, Woodside, CA (US); Darryl Hymel, Batavia, IL (US); Laird C. Williams, St. Charles, IL (US)

(73) Assignee: Rockwell Electronics Commerce Technologies LLC, Wood Dale, IL (US)

( * ) Notice: Subject to any disclaimer, the term of this patent is extended or adjusted under 35 U.S.C. 154(b) by 1049 days.

(21) Appl. No.: 09/615,266

(22) Filed: Jul. 13, 2000

(51) Int. Cl.
G01L 15/04 (2006.01)
H04M 3/22 (2006.01)

(52) U.S. Cl. ............... 704/251; 704/270; 704/278; 379/265.06

(58) Field of Classification Search ......... 704/251–257, 704/270, 274, 275, 278; 379/265.01–266.1, 379/88.22, 88.01–88.03, 88.08
See application file for complete search history.

(56) References Cited

U.S. PATENT DOCUMENTS

| | | | | |
|---|---|---|---|---|
| 4,093,821 A | * | 6/1978 | Williamson | ............ 704/207 |
| 4,241,235 A | | 12/1980 | McCanney | |
| 4,866,756 A | * | 9/1989 | Crane et al. | ............ 379/88.01 |
| 5,199,077 A | * | 3/1993 | Wilcox et al. | ............ 704/256 |
| 5,327,521 A | * | 7/1994 | Savic et al. | ............ 704/272 |
| 5,425,130 A | | 6/1995 | Morgan | |
| 5,697,079 A | * | 12/1997 | Spivey | ............ 455/212 |
| 5,765,134 A | | 6/1998 | Kehoe | |
| 5,870,708 A | * | 2/1999 | Stewart | ............ 704/275 |
| 6,044,347 A | * | 3/2000 | Abella et al. | ............ 704/272 |
| 6,480,826 B1 | * | 11/2002 | Pertrushin | ............ 704/270 |
| 6,542,602 B1 | * | 4/2003 | Elazar | ............ 379/265.06 |
| 6,556,970 B1 | * | 4/2003 | Sasaki et al. | ............ 704/257 |

FOREIGN PATENT DOCUMENTS

DE    198 13 061 A1    9/1999

OTHER PUBLICATIONS

Titze, et al.; "Considerations in Voice transformation with physiologic scaling priniciples"; Speech Communication 22(1997); pp. 113–123.

Abe, et al.; "Speaking Style Coversion by Chaning Prosodic Parameters and Formant Frequencies"; ICSLP 94, Yokohama; pp. 1455–1458.

* cited by examiner

*Primary Examiner*—Abul K. Azad
(74) *Attorney, Agent, or Firm*—Welsh & Katz, Ltd.

(57) ABSTRACT

A method and apparatus are provided for adjusting a content of an oral presentation provided by an agent of an organization and perceived by a human target of the organization based upon an objective of the organization. The method includes the steps of detecting a content of the oral presentation provided by the agent and modifying the oral presentation provided by the agent to produce the oral presentation perceived by the human target based upon the detected content and the organizational objective.

37 Claims, 2 Drawing Sheets

US 7,085,719 B1

VOICE FILTER FOR NORMALIZING AN AGENTS RESPONSE BY ALTERING EMOTIONAL AND WORD CONTENT

FIELD OF THE INVENTION

The field of the invention relates to communication systems and more particularly to telemarketing devices.

BACKGROUND OF THE INVENTION

Telephone devices used for telemarketing are generally known. Such devices may operate to process either incoming or outgoing calls. In the simplest case, an organization controlling the telemarketing process may provide a bank of telephones and a corresponding group of agents to man the bank of telephones. As calls come in, an agent may answer the call and responds to concerns of the caller. When an agent is idle, the organization may provide an outgoing list of customer contacts, which the agent may call when the agent is otherwise not occupied.

In more sophisticated organizations, an automatic call distributor (ACD) may be provided to route calls to idle agents. The ACD may be connected to the public switched telephone network (PSTN) through one or more trunk lines. Often a single telephone number is disseminated to the public for purposes of contacting the organization. The PSTN, upon detecting the disseminated telephone number; routes the calls to the ACD through the one or more trunk lines.

Along with delivery of a call, the PSTN may also deliver information about an incoming call along with the call. For example, a dialed number identification service (DNIS) utility will provide a number dialed by the caller along with the delivered call. Such a utility is important where the organization has a number of departments within the organization, each charged with handling a different subject matter with regard to incoming calls.

Another utility operating from within the PSTN is automatic number identification (ANI). ANI provides a telephone number of a caller along with a call. ANI may be used by a ACD to identify a customer at the instance of call arrival, instead of after the call is answered by an agent.

By relying upon such information as DNIS and ANI, a controller of the ACD may select an agent who is most qualified to answer a call based upon a number dialed or upon an identity of the caller. Further, using ANI, customer records can be retrieved and displayed for the benefit of an answering agent at the same instant as call arrival.

While telemarketing organizations using ACDs are relatively efficient, there is a growing tendency to maximize resources within such organizations. ACDs are often used to receive and place calls over broad areas resulting in an increased workload.

Because of the increased workload and tedium of telemarketing, misunderstandings and disputes occasionally arise between agents and customers. Sometimes, the disputes degenerate into emotional confrontations, which tend to damage the image and success of the organization. Because of the importance of telemarketing, a need exists for a means of controlling an emotional content of a verbal exchange.

SUMMARY

A method and apparatus are provided for adjusting a content of an oral presentation provided by an agent of an organization and perceived by a human target of the organization based upon an objective of the organization. The method includes the steps of detecting a content of the oral presentation provided by the agent and modifying the oral presentation provided by the agent to produce the oral presentation perceived by the human target based upon the detected content and the organizational objective.

DETAILED DESCRIPTION OF A PREFERRED EMBODIMENT

Figure 1:
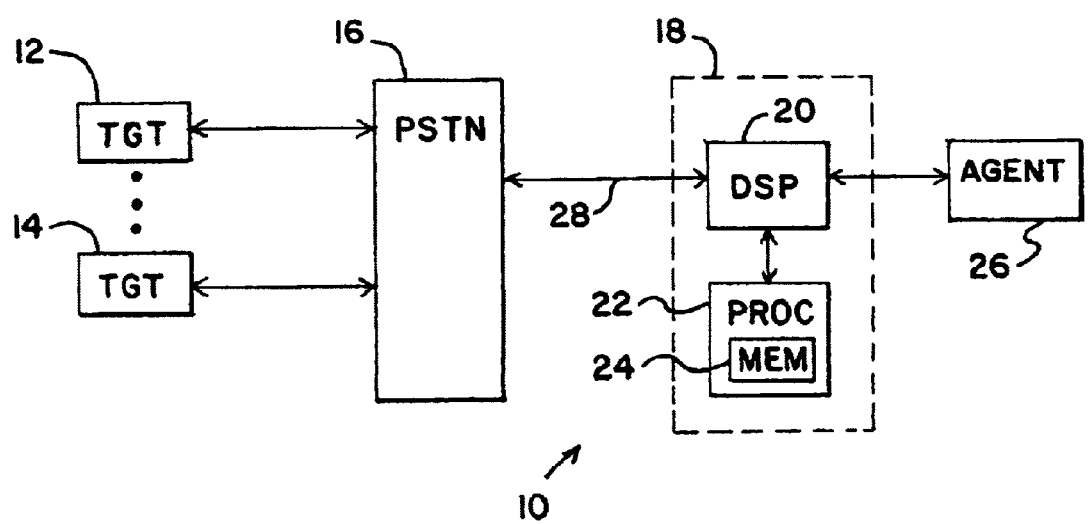
FIG. 1 is a block diagram of a system for modifying the contents of an oral presentation, shown in a context of use, in accordance with an illustrated embodiment of the invention.
Figure 2:
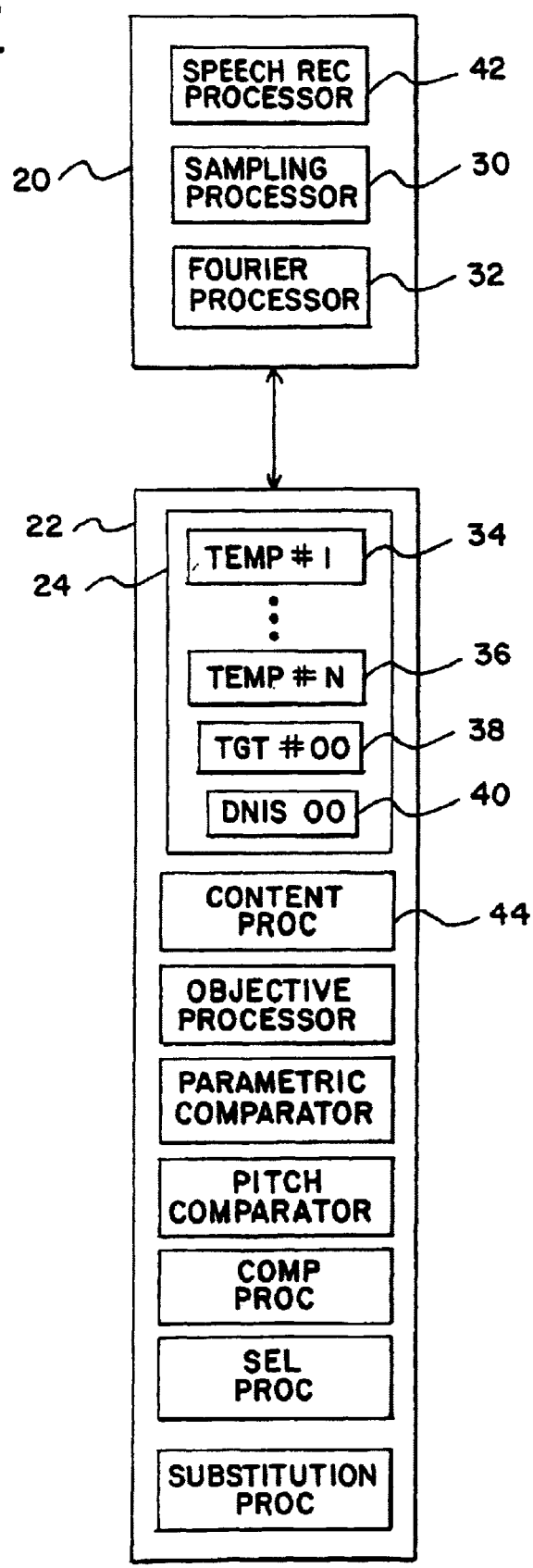
FIG. 2 is a block diagram of processors used by the system of FIG. 1.

FIG. 1 shows a block diagram of an apparatus 10 for modifying a content of an oral presentation of an agent (e.g., a telemarketer), generally in accordance with an illustrated embodiment of the invention. Under the illustrated embodiment, the content of the oral presentation provided by the agent may be modified to suit any of a number of organizational objectives.

In its simplest form, modification of the agent's oral presentation, under illustrated embodiments, could be described as a filter to control emotional content of an agent's voice. The filter may be based upon a template which compares a currently spoken word to prior uses of the word in various emotional states (such as excitement, anger, emotional distress, etc.).

The system 10 may be connected to the PSTN 16 through a telephone connection (e.g., a single telephone line or one or more trunk lines) 28. The PSTN, in turn, may be connected to one or more human targets (e.g., customers, clients, supporters, etc.) 12, 14 of the organization. The target telephone and user of the target telephone will sometimes hereinafter be referred to together simply as the "TGT 12, 14".

Included within the system 10 is a telephone 26 that may be used by an agent of the organization (the agent and his telephone will sometimes hereinafter also be referred to together simply as the "agent 26"). While the system 10 is shown as including a single agent 26, it should be understood that the system 10 may include many agents 26.

It should also be understood that the system 10 may be implemented under many different forms. For example, the system 10 may include a call processor 18 (e.g., an ACD) with many connected agents 26. Alternatively, the call processor 18 may be implemented on a personal computer (PC) with a single connected agent 26. Where the call processor 18, is implemented as an ACD with a number of connected agents 26, it should be understood that each agent may serve a different organization. Further, even where a single agent 26 is involved, the organization objective may differ depending upon the call target 12, 14.

As used herein, an organizational objective means the functional objectives required for the survival of the organization. Further, it is to be understood that functional objectives may be achieved only through outside contacts required for survival of the organization. Typically the outside contact includes an oral presentation by an agent 26 of the organization or an oral exchange between the agent 26 and a human organizational TGT 12, 14 regarding a product of the organization, without regard to who initiated the contact.

For example, if the organization using the system 10 is a merchant, then the organizational objective would be sales and the contact would be between a salesman or solicitor 26 and a member of the general public (i.e., TGT 12, 14). Alternatively, if the organization is a charitable organization, then the organizational objective may be collecting donations and the contact would, again, be through a solicitor. If the organization is a police department, then the organizational objective would be law and order and the contact may be through a dispatcher.

If the organization were a political party, then the organization objective would be winning an election or influencing a vote. If the organization were an environmentalist group, then the organizational objective may simply be public awareness.

Further, adjusting a content of an oral presentation based upon the organization objective means a number of different things depending upon the context. For example, if the organization were a merchant introducing an exciting new product, then the adjustment of the content of the oral presentation may require injecting excitement into a sales presentation. Alternatively, if the merchant is a financial planner, then the content of the solicitor's voice may be adjusted to appear calm and reassuring. Similarly, if the organization were a police department, then the voice may be adjusted to appear authoritative, yet nonthreatening.

If the organization is a charitable organization, then adjusting the content of the oral presentation would mean creating an aura of need. Such an aura may be introduced by adjusting the oral presentation to elicit pity or to inject a plaintive sound into a voice of the solicitor.

Organizational objectives may be further advanced by adjusting a content to eliminate perceived cultural differences or remove offensive material from contacts. A content may also be adjusted by detecting and correcting inappropriate word choices.

It should be understood in this regard that the adjustment of a content of an oral presentation is limited only to the speech of the agent of the organization and not to the organizational target. It should also be understood that, as used herein, "presentation" is intended to include an agent's participation in a two-way conversation and is specifically not limited to (but could include) a one-sided pitch by the agent of the organization's message to the TGT 12, 14.

Under the illustrated embodiment, as calls are detected, the call processor 18 may select different set of organizational objectives based upon call associated information. Where the call is an incoming call, the call-associated information may be DNIS or ANI information. Where the call is outgoing, the call associated information may be the telephone number called.

Where the call-associated information is based upon DNIS information, the processor 22 may select an organizational objective based upon the DNIS information from the PSTN 16. For example, a particular organization may have one incoming number for regular sales calls and another incoming number for promotional sales. The organizational objective for promotional sales may include the generation of excitement for the promoted sale item. The organizational objective for the regular sales calls may simply be to service the call in the quickest, most efficient manner.

Similarly, where the call-associated information is ANI or an outgoing dialed number, the organizational objective may be based upon experience with the TGT 12, 14. An overriding organizational objective for all calls may be to avoid improper emotional or linguistic overtones within the agent's presentation.

Using the call-associated information, a file 38, 40 defining the organizational objectives for the call may be retrieved based upon the call-associated information. The organizational objectives file 38, 40 may include a set of call content parametric values for the call. The call parametric values may be predetermined for each type of call associated information and may be stored within memory 24.

Once the parametric values defining the organizational objectives has been retrieved, the call processor 18 may connect the call to the agent 26 and begin detecting a content of the call. To being detecting a content of the call, a digital signal processor (DSP) 20 (functioning as a sampling processor) may begin sampling a voice signal from the agent and a voice signal from the TGT 12, 14. The sampled signals from the agent 26 and TGT 12, 14 may then each be converted into a voice profile within a Fourier processor 32 using a fast Fourier transform (FFT).

Using the voice profile of the TGT 12, 14, a word recognition (e.g., a speech recognition) processor 42 may be used to determine a word content and a dialect being used by the TGT 12, 14. The detected word content and dialect may be stored in memory 24 for later use as discussed below.

Next, the voice profile of the agent 26 may also be applied to the word recognition processor 42 to detect a content of the oral presentation of the agent. The content may include a word content, a word rate and a dominant frequency.

The word count, word rate and dominant frequency may then be compared with the contents of a selected one of the objective files 38, 40 in a content processor 44 to determine whether any modification or adjustments are in order. Modification of the content of the agent's presentation may be performed on a word-by-word basis or upon an entire word stream from the agent based upon the content of the selected objectives file 38, 40.

If the organizational objective requires excitement, then the detected content may be modified to reflect the organizational objective using a number of different methods. For example, it would generally be recognized that a person speaking with an elevated voice pitch and/or volume would appear excited. To modify the detected content to reflect excitement, the DSP 20 under control of the processor 22 may first take the FFT profile for each word spoken by the agent and shift the profile upwards in frequency by a predetermined amount. The DSP 20 may then perform an inverse FFT on the profile to recreate the word at an elevated frequency. A volume of the recreated word may then be increased to complete the impression of excitement.

Alternatively, the impression of excitement may be created using a second method. Under the second method, an FFT word profile may be created for each agent 26 for many normally used words under a number of different emotional states. When the organizational objective requires excitement, a recognized word of the agent 26 is simply replaced by the same word of the required emotional state following an inverse FFT transform of the proper FFT word profile.

To avoid improper emotional overtones in an agent's presentation, the FFT profile of recognized words may be continuously compared with the corresponding word templates of the various emotional states of the agent. Where a match is found, an indicia of the emotional level of the match is compared with a desired emotional level based upon the organization objective for the call as defined within the objectives files 38, 40. The indicia may also be compared with threshold levels for desired emotional level the type of call involved. Where the indicia exceeds the threshold level a substitutions may be made.

An emotional state of the agent 26 may also be measured for supervisory purposes based upon any of a number of other criteria (e.g., word pitch, delivery speed, word choice, etc.). The measured emotional state may be used as an indication that the agent may be overstressed and in need of appropriate relief (e.g., a rest break).

Where an improper emotional content is found in a recognized word (or words), that word is replaced by a word of the proper emotional content from its corresponding FFT profile. As above, the proper word is recreated using an inverse FFT of the template. The proper word is then substituted for the emotionally charged word.

Similarly, dialect may be matched to the TGT 12, 14 using templates 34, 36. Where the objectives files 38, 40 require or where the recognized dialect of the TGT 12, 14 suggest a particular dialect, the processor 22 may modify the agent's presentation to match that dialect. Such matching may be accomplished by first recognizing each word from the agent 26 and the select a template for the corresponding word in the particular dialect required. The template may then be used to substitute the word in the proper dialect for the word spoken by the agent 26.

Further, key words may be accentuated where required by the objective file 38, 40. For example, some words of a promotional presentation (e.g., related to price, performance, reliability, warranty, etc.) may be considered key to achieving a sale. The DSP 20 and processor 22 may be programmed to recognize and accentuate words or phrases deemed key to a successful sales presentation.

Additional words may be inserted where appropriate or necessary. For example, where a product has a limited warranty, it would be considered very important to identify those instances where "warranty" were recited alone and to replace such instances with the words "limited warrant". The time differences created by the additional words may be compensated by increasing a word rate to maintain a near real-time exchange between the agent 26 and TGT 12, 14.

Further, inappropriate word choices or profanity may be replaced with more constructive language. For example, the recognized word "deadbeat" may be replaced with "slow payer", "divorced mother" with "single mother", etc.

Similarly, profanity may be replaced with less offensive words, where appropriate, or simply omitted where no purpose can be detected in the use of such words. Gaps in the presentation, again, may be compensated by increasing or decreasing a short term words rate.

In another illustrated embodiment, the objectives files 38, 40 may be changed in small detail and an objective measure of contact results (e.g., completed sales) may be compared among the original and changed objectives files. Any differences in results may be used to suggest improvements to the objectives files 38, 40 which are used to generate the modified content and presentation styles provided by the system 10.

To further enhance organization results, an emotional state of the TGT 12, 14 may also be measured based upon selected criteria (e.g., word pitch, delivery speed, word choice, etc.). Where an adverse reaction is detected to a particular modification of detected content (e.g., the TGT 12, 14 yells at the agent, uses obscenities, etc.), the associated objectives file 38, 40 (and agent 26) may be quickly identified for remedial action.

A specific embodiment of a method and apparatus of adjusting a content of an oral presentation according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of adjusting a content of an oral presentation provided by an agent of an organization and perceived by a human target of the organization based upon an objective of the organization, such method comprising the steps of:
- detecting a content of the oral presentation provided by the agent;
- recognizing a spoken word content; and
- modifying the oral presentation provided by using a substitute equivalent word if an inappropriate word choice is detected or removing a word if no purpose can be detected in the use of the word to produce the oral presentation perceived by the human target based upon the detected content and the organizational objective, wherein said agent and human target are different and said human target only hears the modified oral presentation and not the oral presentation of the agent.

2. The method of adjusting a content of an oral presentation as in claim 1 further comprising determining the organization objective for controlling modification of the oral presentation to the target.

3. The method of adjusting a content of an oral presentation as in claim 2 wherein the step of determining the organization objective for the target further comprises retrieving call associated information relating to the target.

4. The method of adjusting a content of an oral presentation as in claim 1 wherein the step of detecting a content further comprises detecting an emotion content.

5. The method of adjusting a content of an oral presentation as in claim 4 wherein the step of detecting the emotional content of the oral presentation further comprises detecting a pitch of the oral presentation.

6. The method of adjusting a content of an oral presentation as in claim 1 wherein the step of detecting a spoken word content of the oral presentation further comprises comparing the recognized spoken word content with a set of verbal templates.

7. The method of adjusting a content of an oral presentation as in claim 6 wherein the step of comparing the recognized spoken word content with a set of verbal templates further comprises selecting a template of the set of templates with a nearest match.

8. The method of adjusting a content of an oral presentation as in claim 7 further comprising determining an emotional state from indicia of emotional state stored with the matching template.

9. The method of adjusting a content of an oral presentation as in claim 6 wherein the step of comparing the recognized spoken word content with a set of verbal templates further comprises substituting a less objectionable word for at least a portion of the recognized spoken word content.

10. The method of adjusting a content of an oral presentation as in claim 6 wherein the step of comparing the recognized spoken word content with a set of verbal templates further comprises substituting an equivalent word of a different dialect for the recognized word content.

11. The method of adjusting a content of an oral presentation as in claim 1 wherein the step of modifying the detected content of the presentation further comprises adjusting a parameter of the presentation in small detail to alter a perception of an emotional state of a presenter of the presentation.

12. The method of adjusting a content of an oral presentation as in claim 1 wherein the step of adjusting the parameter of the presentation in small detail further comprises comparing an objective measure of contact results using the adjusted parameter with an objective measure of contact results using an unadjusted parameter.

13. A method of adjusting a content of an oral presentation provided by an agent of an organization and perceived by a human target of the organization based upon an objective of the organization, such method comprising the steps of:
 detecting a content of the oral presentation provided by the agent;
 recognizing a spoken word content of the detected content; comparing the recognized spoken word content with a set of verbal templates;
 substituting an equivalent word with an emotional content consistent with the organization objective if an inappropriate word choice is detected or removing a word if no purpose can be detected in the use of the word; and
 modifying the oral presentation provided by the agent using said substituted equivalent word or said removal of the word to produce the oral presentation perceived by the human target based upon the detected content and the organizational objective.

14. An apparatus for adjusting a content of an oral presentation provided by an agent of an organization and perceived by a human target of the organization based upon an objective of the organization, such apparatus comprising:
 means for detecting a content of the oral presentation provided by the agent;
 means for recognizing a spoken word content; and
 means for modifying the oral presentation provided by the agent by substituting an equivalent word if an inappropriate word choice is detected or by removing a word if no purpose can be detected in the use of the word to produce the oral presentation perceived by the human target based upon the detected content and the organizational objective, wherein said agent and human target are different and said human target only hears the modified oral presentation and not the oral presentation of the agent.

15. The apparatus for adjusting a content of an oral presentation as in claim 14 further comprising means for determining the organization objective for controlling modification of the oral presentation to the target.

16. The apparatus for adjusting a content of an oral presentation as in claim 15 wherein the means for determining the organization objective for the target further comprises means for retrieving call associated information relating to the target.

17. The apparatus for adjusting a content of an oral presentation as in claim 14 wherein the means for detecting a content further comprises means for detecting an emotion content.

18. The apparatus for adjusting a content of an oral presentation as in claim 17 wherein the means for detecting the emotional content of the oral presentation further comprises means for detecting a pitch of the oral presentation.

19. The apparatus for adjusting a content of an oral presentation as in claim 14 wherein the means for detecting a spoken word content of the oral presentation further comprises means for comparing the recognized spoken word content with a set of verbal templates.

20. The apparatus for adjusting a content of an oral presentation as in claim 19 wherein the means for comparing the recognized spoken word content with a set of verbal templates further comprises means for selecting a template of the set of templates with a nearest match.

21. The apparatus for adjusting a content of an oral presentation as in claim 20 further comprising means for determining an emotional state from indicia of emotional state stored with the matching template.

22. The apparatus for adjusting a content of an oral presentation as in claim 19 wherein the means for comparing the recognized spoken word content with a set of verbal templates further comprises means for substituting a less objectionable word for at least a portion of the recognized spoken word content.

23. The apparatus for adjusting a content of an oral presentation as in claim 19 wherein the means for comparing the recognized spoken word content with a set of verbal templates further comprises means for substituting an equivalent word of a different dialect for the recognized word content.

24. The apparatus for adjusting a content of an oral presentation as in claim 14 wherein the means for modifying the detected content of the presentation further comprises means for adjusting a parameter of the presentation to alter a perception of an emotional state of a presenter of the presentation.

25. An apparatus for adjusting a content of an oral presentation provided by an agent of an organization and perceived by a human target of the organization based upon an objective of the organization, such apparatus comprising:
 means for detecting a content of the oral presentation provided by the agent;
 means for recognizing a spoken word content;
 means for comparing the recognized spoken word content with a set of verbal templates;
 means for substituting an equivalent word with an emotional content consistent with the organization objective; and
 means for modifying the oral presentation using the equivalent word provided by the means for substituting to produce the oral presentation perceived by the human target based upon the detected content and the organizational objective.

26. An apparatus for adjusting a content of an oral presentation provided by an agent of an organization and perceived by a human target of the organization based upon an objective of the organization, such apparatus comprising:
 a speech processor adapted to detect a spoken word content of the oral presentation provided by the agent; and
 a content processor adapted to modify the oral presentation provided by the agent by substituting equivalent words if an inappropriate word choice is detected or removing a word if no purpose can be detected in the use of the word to produce the oral presentation perceived by the human target based upon the detected content and the organizational objective, wherein said agent and human target are different and said human target only hears the modified oral presentation and not the oral presentation of the agent.

27. The apparatus for adjusting a content of an oral presentation as in claim 26 further comprising an objective processor adapted to determine the organization objective for controlling modification of the oral presentation to the target.

28. The apparatus for adjusting a content of an oral presentation as in claim 27 wherein the objective processor further comprises a memory adapted to contain call associated information relating to the target.

29. The apparatus for adjusting a content of an oral presentation as in claim 26 wherein the content processor further comprises a parametric comparator adapted to detect an emotion content.

30. The apparatus for adjusting a content of an oral presentation as in claim 26 wherein the means for parametric comparator further comprises a pitch comparator adapted to compare a detected pitch of the oral presentation with a threshold value associated with the organizational objective.

31. The apparatus for adjusting a content of an oral presentation as in claim 26 wherein the speech processor further comprises a word recognition processor adapted to recognize a spoken word content.

32. The apparatus for adjusting a content of an oral presentation as in claim 31 wherein the content processor further comprises a comparison processor adapted to compare the recognized spoken word content with a set of verbal templates.

33. The apparatus for adjusting a content of an oral presentation as in claim 32 wherein the comparison processor further comprises a selection processor adapted to select a template of the set of templates with a nearest match.

34. An apparatus for adjusting a content of an oral presentation provided by an agent of an organization and perceived by a human target of the organization based upon an objective of the organization, such apparatus comprising:
 a speech processor adapted to detect a content of the oral presentation provided by the agent;
 a word recognition processor adapted to recognize a spoken word content;
 a comparison processor adapted to compare the recognized spoken word content with a set of verbal templates;
 a substitution processor adapted to substitute one of a less objectional word, an equivalent word with an emotional content consistent with the organization objective and a word of a different dialect; and
 a content processor adapted to modify the oral presentation provided by the agent using the one of the less objectional word, the equivalent word and a word of a different dialect provided by the substitution processor to produce the oral presentation perceived by the human target based upon the detected content and the organizational objective.

35. A method of modifying an emotional content and word content of an oral presentation, such method comprising the steps of:
 detecting the emotional content of the oral presentation;
 detecting a spoken word content; and
 modifying the oral presentation based upon the detected emotional and word content by substituting an equivalent word if an inappropriate word choice is detected or removing a word if no purpose can be detected in the use of the word wherein said agent and human target are different and said human target only hears the modified oral presentation and not the oral presentation of the agent.

36. An apparatus for modifying an emotional content and word content of an oral presentation, such apparatus comprising:
 means for detecting the emotional content of the oral presentation;
 means for detecting a spoken word content; and
 means for modifying the oral presentation based upon the detected emotional and word content by substituting an equivalent word if an inappropriate word choice is detected or removing a word if no purpose can be detected in the use of the word wherein said agent and human target are different and said human target only hears the modified oral presentation and not the oral presentation of the agent.

37. An apparatus for modifying an emotional content and word content of an oral presentation, such apparatus comprising:
 a speech processor adapted to detect the emotional and word content of the oral presentation; and
 a content processor adapted to modify the oral presentation based upon the detected emotional and word content by substituting an equivalent word if an inappropriate word choice is detected or removing a word if no purpose can be detected in the use of the word wherein said agent and human target are different and said human target only hears the modified oral presentation and not the oral presentation of the agent.

* * * * *